United States Patent
Sand

[11] Patent Number: 5,873,291
[45] Date of Patent: Feb. 23, 1999

[54] APPARATUS FOR CUTTING REINFORCING FIBER MATERIAL

[75] Inventor: Kjell Sand, Västra Frölunda, Sweden

[73] Assignee: Aplicator System AB, Sweden

[21] Appl. No.: 776,456

[22] PCT Filed: Jul. 11, 1995

[86] PCT No.: PCT/SE95/00842

§ 371 Date: Jan. 21, 1997

§ 102(e) Date: Jan. 21, 1997

[87] PCT Pub. No.: WO96/02475

PCT Pub. Date: Feb. 1, 1996

[30] Foreign Application Priority Data

Jul. 18, 1994 [SE] Sweden ................................ 9402520

[51] Int. Cl.⁶ ............................................... B26D 5/20
[52] U.S. Cl. .................................. 83/260; 83/98; 83/348; 83/402; 83/950
[58] Field of Search ........................... 83/347, 348, 402, 83/98, 99, 260, 950

[56] References Cited

U.S. PATENT DOCUMENTS

| | | | |
|---|---|---|---|
| 488,129 | 12/1892 | Mendenhall | 83/542 |
| 3,334,532 | 8/1967 | Mylo | 83/402 |
| 3,353,431 | 11/1967 | Mylo | 83/348 |
| 3,890,706 | 6/1975 | Johnson | 83/347 |
| 3,992,967 | 11/1976 | Fram | 83/347 |
| 4,249,441 | 2/1981 | Sturtz | 83/347 |
| 4,287,799 | 9/1981 | Fujita et al. | 83/347 |
| 4,319,506 | 3/1982 | Warren et al. | 83/347 |
| 4,406,196 | 9/1983 | Roncato et al. | 83/347 |
| 4,637,286 | 1/1987 | Boggs | 83/347 |
| 4,640,165 | 2/1987 | McMahon et al. | 83/348 |
| 5,398,575 | 3/1995 | Rewitzer | 83/348 |

FOREIGN PATENT DOCUMENTS 1257352   2/1961   France .

Primary Examiner—M. Rachuba
Assistant Examiner—Sean A. Pryor
Attorney, Agent, or Firm—Ostrolenk, Faber, Gerb & Soffen, LLP

[57] ABSTRACT

Apparatus for cutting fibrous reinforcement material in relationship with an ejector nozzle. The apparatus comprises at least two feeding rollers and a rotary cutter which is provided with a substantially cylindrical mantle surface with attachments for a number of knives. These cooperate with a support roller with an elastic surface layer for forming a thread nip. The mantle surface of the cutter is provided with slot-shaped recesses for the fiber thread, which recesses extend peripherally along the mantle surface and between successive knives. The recesses enable the thread to be fed forward by means of the feeding rollers at a feeding rate which deviates from the speed of the cutter, for adaptation of the cutting length of the fiber thread.

9 Claims, 1 Drawing Sheet

APPARATUS FOR CUTTING REINFORCING FIBER MATERIAL

TECHNICAL FIELD

The present invention refers to an apparatus for cutting fibrous reinforcement material in relationship with an ejector nozzle, comprising at least two feeding rollers and a rotary cutter which is provided with a substantially cylindrical mantle surface with attachments for a number of knife means and which cooperate with a support roller with an elastic surface layer for forming a thread nip.

BACKGROUND OF THE INVENTION

In robot-controlled production, there is usually a high demand for precision in the delivery of raw material. For example, when feeding fiber thread to a robot-controlled fiber feeding apparatus, the feeding rate may be about 10 meters per second. If jerks occur in feeding, the thread may be torn off or damaged, which will lead to serious losses in production.

When cutting fiber thread, a cutting apparatus of the above described type is normally used. Each time the fiber thread is hit by the sharp edge of the knife means, the fiber is folded in V-shape around the edge while being pressed into the elastic layer of the support roller. This operation occurs at a high frequency during a period of time of some fractions of a second. The mechanical deformation leads to fracture of the single fibers of the thread.

Known apparatus for this purpose are adapted to cutting fibers of a certain thread length. The distance between two cuts normally depends upon the distance between the knife means of the cutter. Thus, the feeding rate of the feeding rollers and the cutter is synchronized.

It would be desirable to be able to vary the length of the cut fiber pieces infinitely variable. Besides, a drawback with the method is in that a sudden jerk is developed in the thread each time it is hit by a knife means, because the thread is momentarily accelerated while being folded around the knife edge. These rapid jerks can lead to tearing off of the fiber thread at wrong places.

THE TECHNICAL PROBLEM

One object of the present invention is therefore to provide a cutting apparatus which enables infinitely variable length of the cut fibre pieces, and which is able to dampen the jerks which are developed when the edge of the knife means hit the fiber thread.

THE SOLUTION

For this purpose the invention is characterized in that the mantle surface of the cutter is provided with slot-shaped recesses for the fiber thread, which recesses extend peripherally along the mantle surface between the knife means enabling the thread to be fed forward by means of the feeding rollers at a feeding rate which deviates from the speed of the cutter, for adaption of the cutting length of the fiber thread.

DESCRIPTION OF THE DRAWINGS

The invention will be described here below with reference to an embodiment shown in the accompanying drawing, in which FIG. 1 schematically shows a fiber feeding device in a view from the side.

DESCRIPTION OF PREFERRED EMBODIMENTS

Figure 1:
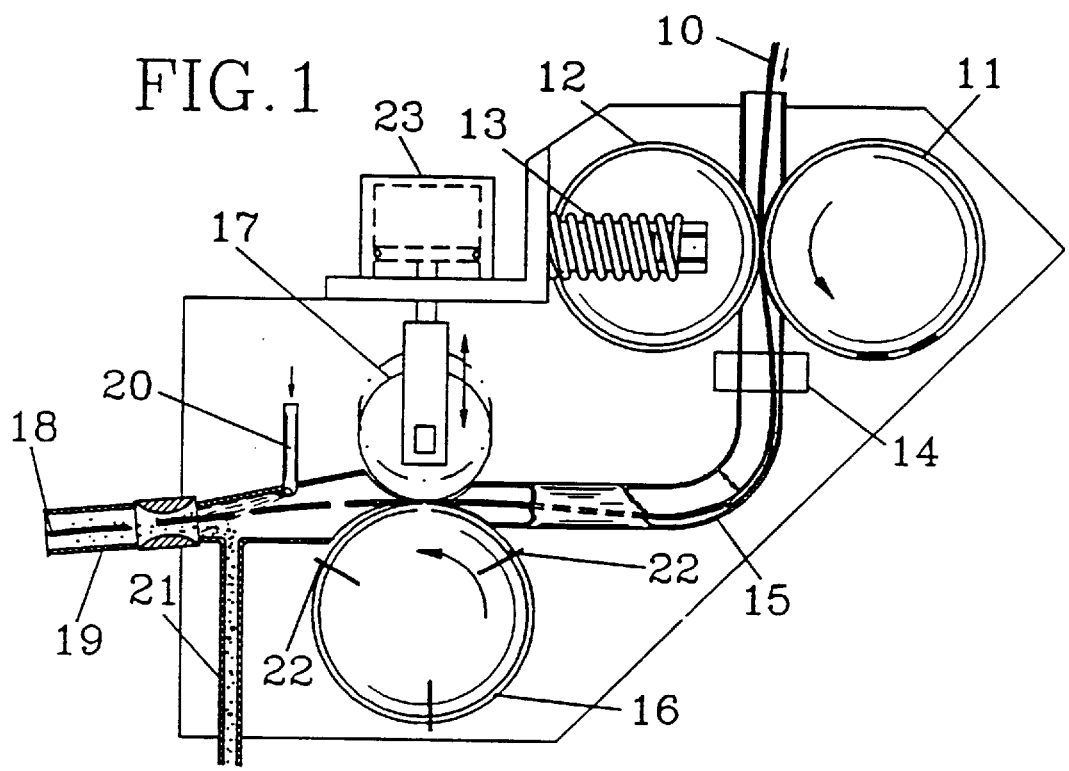

The feeding apparatus schematically shown in FIG. 1 is used mounted upon a robot arm not shown, for feeding out fiber thread 10 and binding agent in the form of powder from not shown magazines, for example to molds for plastic products.

Preferably, the robot arm is freely movable in the room and is governed by a micro processors not shown, which can be programmed.

The fiber thread 10 is drawn from its magazine into the feeding apparatus by means of two feeding rollers 11, 12, which form a nip for the fiber thread and comprises a first motor driven roller 11 and a second co-rotating roller 12.

The roller 12 has a displaceable bearing not shown which is pressed in the direction towards the roller 11 by means of a compression spring 13. The roller 11 is driven in a speed. adjustable manner by means of a not shown driving motor.

The rollers 11, 12 feed the fiber thread 10 forward via a compressed air ejector 14 and a tube 15, which is bent to about 90° and the thread emerges into the nip between a knife roller 16 and a support roller 17.

The fiber thread pieces 18 cut by the knife roller 16 can be blown out through an ejector pipe 19 which is provided with a connection 20 for compressed air. Also, the ejector pipe 19 is provided with a connection 21 to a conduit for supply of a pulverulent bonding agent.

The cutter 16 is provided with three knife blades 22 which are distributed with equal spacing around the periphery of the roller. The cutter 16 can be driven in a speed adjustable manner by means of a not shown Priving motor. The opposing support roller 17 is provided with an elastic surface layer 17a and is maneuverable by means of a pneumatic piston 23. Cutting of the fiber thread 10 is started by maneuvering the support roller 17 by means of the piston 23 toward the cutter 16. Uncut thread 10 can be fed out through the ejector pipe, 19 when the support roller 17 is maneuvred away from the cutter 16.

Figure 2:
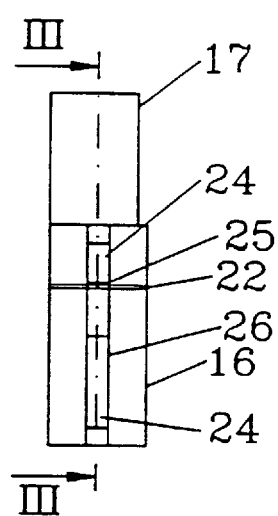
FIG. 2 shows in a plane view in somewhat larger scale the nip between the cutter and the support roller.
Figure 3:
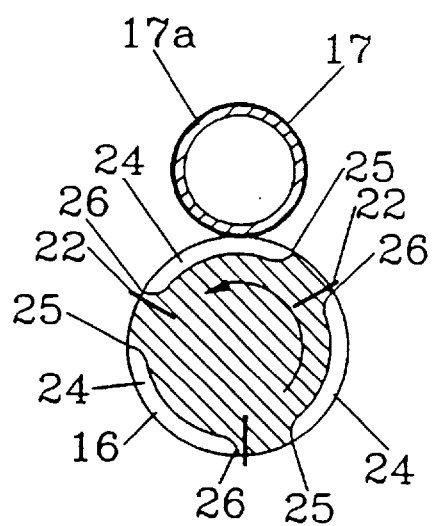
FIG. 3 is a section along the line III—III in FIG. 2.

FIGS. 2 and 3 show that the mantle surface of the cutter 16 is provided with slot-shaped recesses 24 for the fiber thread 10, which recesses extend peripherally along the mantle surface from a point 25 adjacent the rear side of the respective knife blade 22, as seen in the direction of rotation, to a point 26 somewhat in front of the next following knife blade 22.

The recesses makes it possible to feed the thread 10 through the cutting device, without moving the support roller 17 form the cutter 16. This enables the variation of the length of the fiber pieces within comparatively wide limits. For example, the feeding rollers 11, 12 can be driven more slowly than the cutting device, so that very short fiber pieces are produced. Alternatively, the feeding rollers 11, 12 can be driven at a higher speed than the cutting device, so that very long fiber pieces are produced.

At each time the fiber thread 10 is cut, it is drawn forward intermittently a short length at a higher speed than the normal feeding speed of the thread. The slot-shaped recesses enable the forming of a short slack in the thread adjacent its end, at the moment from when the cut has occurred and until the next following knife blade hits the thread at a distance from the free end of the thread, which slack is enough to prevent development of jerks in the thread which can lead to uncontrolled tearing of the thread or to increased wear in the feeding rollers 11, 12. The length of this slack is controlled by the depth of the recesses and is sufficient to compensate for the variations in the pulling force, when the knife hits the thread and folds it while it is pressed into the elastic surface layer 17a of the support roller 17.

Because the point 25 is located at some distance before the next following knife blade 22, the free end of the thread is caught up by the nip between the cutter 16 and the support roller 17, before the knife blade hits the thread 10.

The piston 23 is preferably connected to a microprocessor 23A which enables compensation for wear upon the elastic surface layer 17a of the support roller 17.

The invention is not limited to the embodiments described here above, but several variants are conceivable within the scope of the following claims. For example, the cutter 16 may be provided with parallel groves 24 for two or more fiber threads 10, wherein the cutter may have a corresponding number of support rollers 17, which may be individually maneuverable.

I claim:

1. Apparatus for cutting fiber thread, comprising:

a cutter for cutting the fiber thread, means for feeding the thread to the cutter; means for moving the cut threads away from the cutter;

the cutter comprising a rotary cutter having a substantially cylindrical mantle surface; a plurality of circumferentially spaced apart knives at the mantle surface for cutting thread at the knives;

a support roller opposed to the mantle surface of the rotary cutter, including an elastic surface layer which cooperates with the mantle surface and with the knives of the rotary cutter, the elastic surface layer forming a thread nip with the cylindrical mantle surface;

slot shaped recesses in the mantle surface between the spaced apart knives, each of the slot shaped recesses have a width and a length, the length being longer than the width, the length extending circumferentially along the mantle surface, the slot shaped recesses receiving the fiber thread in the recesses, so that the fiber and cut thread move into and along the recesses, wherein the fiber thread fed by the feeding means may be fed at a feeding rate which deviates from a rotary speed of the mantle surface of the rotary cutter for adaptation of a cutting length of the fiber thread.

2. The apparatus of claim 1, wherein the means for moving the cut threads away from the cutter comprises an ejector nozzle through which the fiber threads are ejected.

3. The apparatus of claim 1, wherein the means for feeding the fiber threads comprises a pair of feed rollers upstream in a path of the fiber thread from the rotary cutter, the rollers defining a nip between the rollers through which the fiber thread is fed.

4. The apparatus of claim 1, wherein there are a plurality of the knives on the rotary cutter.

5. The apparatus of claim 4, wherein the knives have rear and front sides as seen in a direction of rotation of the rotary cutter; and there is a respective recess in the mantle surface extending from a point at the rear side of one of the knives as seen in the rotation direction to a point at the front side of the next following knife as seen in the rotation direction.

6. The apparatus of claim 5, wherein the recess extends from a point that is adjacent the rear side of the leading knife in the rotation direction to a point a greater distance in front of the next following knife in the rotation direction.

7. The apparatus of claim 5, wherein the support roller is moveable toward and away from the cylindrical mantle surface of the rotary cutter and control means for controlling the movement of the support roller.

8. The apparatus of claim 7, wherein the control means comprises means for compensating for wear of the elastic surface of the support roller.

9. The apparatus of claim 1, wherein the support roller is moveable toward and away from the cylindrical mantle surface of the rotary cutter; and control means for controlling the movement of the support roller.

\* \* \* \* \*